US007168978B1

(12) United States Patent
Trout et al.

(10) Patent No.: US 7,168,978 B1
(45) Date of Patent: Jan. 30, 2007

(54) SLIDE-TO-LATCH PANEL MOUNT CONNECTOR

(75) Inventors: David Allison Trout, Lancaster, PA (US); Richard Nicholas Whyne, Camp Hill, PA (US)

(73) Assignee: Tyco Electronics Corporation, Middletown, PA (US)

(*) Notice: Subject to any disclaimer, the term of this patent is extended or adjusted under 35 U.S.C. 154(b) by 0 days.

(21) Appl. No.: 11/412,496

(22) Filed: Apr. 27, 2006

(51) Int. Cl.
*H01R 13/73* (2006.01)
*H02B 1/01* (2006.01)

(52) U.S. Cl. ...................................... 439/545; 439/557

(58) Field of Classification Search ................ 439/545, 439/557, 552, 561, 554, 555
See application file for complete search history.

(56) References Cited

U.S. PATENT DOCUMENTS 4,820,180 A * 4/1989 Mosquera et al. .......... 439/248
5,017,151 A * 5/1991 Peterson ..................... 439/248
5,127,852 A * 7/1992 Cravens et al. ............. 439/545
5,407,363 A * 4/1995 Polgar et al. ............... 439/546
5,540,598 A * 7/1996 Davis .......................... 439/79
6,095,854 A 8/2000 Sommer et al.
6,174,185 B1 * 1/2001 Cecil, Jr. .................... 439/248
6,176,738 B1 1/2001 Consoli et al.
6,312,285 B1 * 11/2001 Berg et al. .................. 439/545
6,315,606 B1 * 11/2001 Hwang ....................... 439/557
6,358,086 B1 * 3/2002 Gallagher et al. .......... 439/538
6,450,834 B1 * 9/2002 Polgar et al. ............... 439/546
2003/0124907 A1 * 7/2003 Ushiro et al. ............... 439/557

* cited by examiner

*Primary Examiner*—Tulsidas C. Patel
*Assistant Examiner*—Vladimir Imas

(57) ABSTRACT

An electrical connector for mounting to a panel includes a connector housing having a forward mating end and a first side. The housing is configured to be inserted into a panel opening that has an inner edge. The housing is inserted into the panel opening in a loading direction and is movable laterally relative to the panel opening in a latching direction to a latched position. The latching direction differs from the loading direction. A latch member includes a latch beam extending from the first side of the housing and a latch element is positioned on a forward facing surface of the latch beam. The latch element engages the inner edge of the panel opening when the housing is in the latched position to hold the housing in the latched position. A stop member is formed on the first side of the housing. The stop member is positioned to engage a rearward facing surface of the latch beam to inhibit removal of the housing from the panel opening while in the latched position.

20 Claims, 5 Drawing Sheets

SLIDE-TO-LATCH PANEL MOUNT CONNECTOR

BACKGROUND OF THE INVENTION

The invention relates generally to electrical connectors, and more particularly, to a panel mount connector having a latch mechanism that provides for mounting of the connector without hardware.

In general, an electrical cable includes one or more conductors, which may be wire conductors, that are surrounded by insulation. Networked electronic systems often include a number of devices communicating with other devices through a number of associated electrical cables with electrical connectors. Typically, one device is connected to another device or system through a single conductor or multiple conductors that are terminated with contacts in a connector housing. To terminate the conductors to the connector contacts, wire insulation is removed from an end of the cable to expose the conductors therein. The conductors are placed into the contacts of the connector and the conductors are attached thereto, such as with crimping or soldering techniques.

It is common to utilize a backshell on an electrical connector to protect the conductors of the electrical cable which are connected to the contacts in the connector. The backshell covers the contact tails to prevent someone or something from inadvertently touching the energized contacts. The backshell may also provide strain relief for the cable so that excessive forces applied to the cable will not cause the cable conductors to become disconnected from the contacts in the connector housing.

In at least some electronic systems, the electrical connectors are mounted to a connector panel for mating with a complementary mating connector. The connectors are mounted to the connector panel using a variety of methods such as brackets, clamps, or threaded bolts or other fasteners. With the continuously increasing demand for resources in today's systems, connector space on the connector panels is in short supply. In many instances, due to space limitations, system operators limit the amount of connector space available for each application. In addition to the size of the connectors and backshells themselves, features that may be provided for particular mounting arrangements may also contribute to space shortages on the connector panel by increasing the space required between connectors. For example, U.S. Pat. No. 6,095,854 describes a panel mounting system for a connector that includes a side mounted latch that is enclosed in a protective shroud to protect the latch from breakage. As another example, U.S. Pat. No. 6,312,285 describes a panel mounting system that includes a latch mechanism on the top of the connector that almost doubles the height of the connector.

A need remains for a connector assembly that has a smaller footprint to facilitate saving space on the connector panels. It would be further desirable to provide a connector assembly that is mountable to the panel without the need for tools or mounting hardware.

BRIEF DESCRIPTION OF THE INVENTION

In one aspect, an electrical connector for mounting to a panel is provided. The connector includes a connector housing having a forward mating end and a first side. The housing is configured to be inserted into a panel opening in the panel. The panel opening has an inner edge. The housing is inserted into the panel opening in a loading direction and is movable laterally relative to the panel opening in a latching direction to a latched position. The latching direction differs from the loading direction. A latch member includes a latch beam extending from the first side of the housing and a latch element is positioned on a forward facing surface of the latch beam. The latch element engages the inner edge of the panel opening when the housing is in the latched position to hold the housing in the latched position. A stop member is formed on the first side of the housing. The stop member is positioned to engage a rearward facing surface of the latch beam to inhibit removal of the housing from the panel opening when the housing is in the latched position.

Optionally, the connector further includes a backshell that has a connector receiving end and a cable exit end. The connector housing coupled to the connector receiving end of the backshell. The backshell has an edge at the connector receiving end that engages the panel to limit movement of the housing in the loading direction. The stop member is configured to engage the latch beam to limit movement of the housing in a direction opposite the latching direction while the latch element is engaged with the inner edge panel opening. Alternatively, the housing includes a flange formed on a third side of the housing. The flange extends from the housing in a direction substantially perpendicular to the loading and latching directions. The flange engages the panel to limit movement of the housing in the loading direction. The latching direction is substantially perpendicular to the loading direction.

In another aspect, an electrical connector for mounting to a panel is provided that includes a connector housing having a forward mating end and a first side. The housing is configured to be inserted into a panel opening in the panel. The panel opening has an inner edge. The housing is inserted into the panel opening in a loading direction and is movable laterally relative to the panel opening in a latching direction to a latched position. The latching direction differs from the loading direction. A latch member includes a latch beam extending from the first side of the housing and a latch element is positioned on a forward facing surface of the latch beam. The latch element engages the inner edge of the panel opening when the housing is in the latched position to hold the housing in the latched position. A stop member is formed on the first side of the housing. The stop member is positioned to engage a rearward facing surface of the latch beam to inhibit removal of the housing from the panel opening when the housing is in the latched position. A retention tab is formed on a second side of the housing opposite the first side. The retention tab has a length substantially equal to a length of the second side. The retention tab extends from the housing in the latching direction. The retention tab engages a forward side of the panel to inhibit extraction of the housing from the panel opening when the housing is in the latched position.

DETAILED DESCRIPTION OF THE INVENTION

Figure 1:
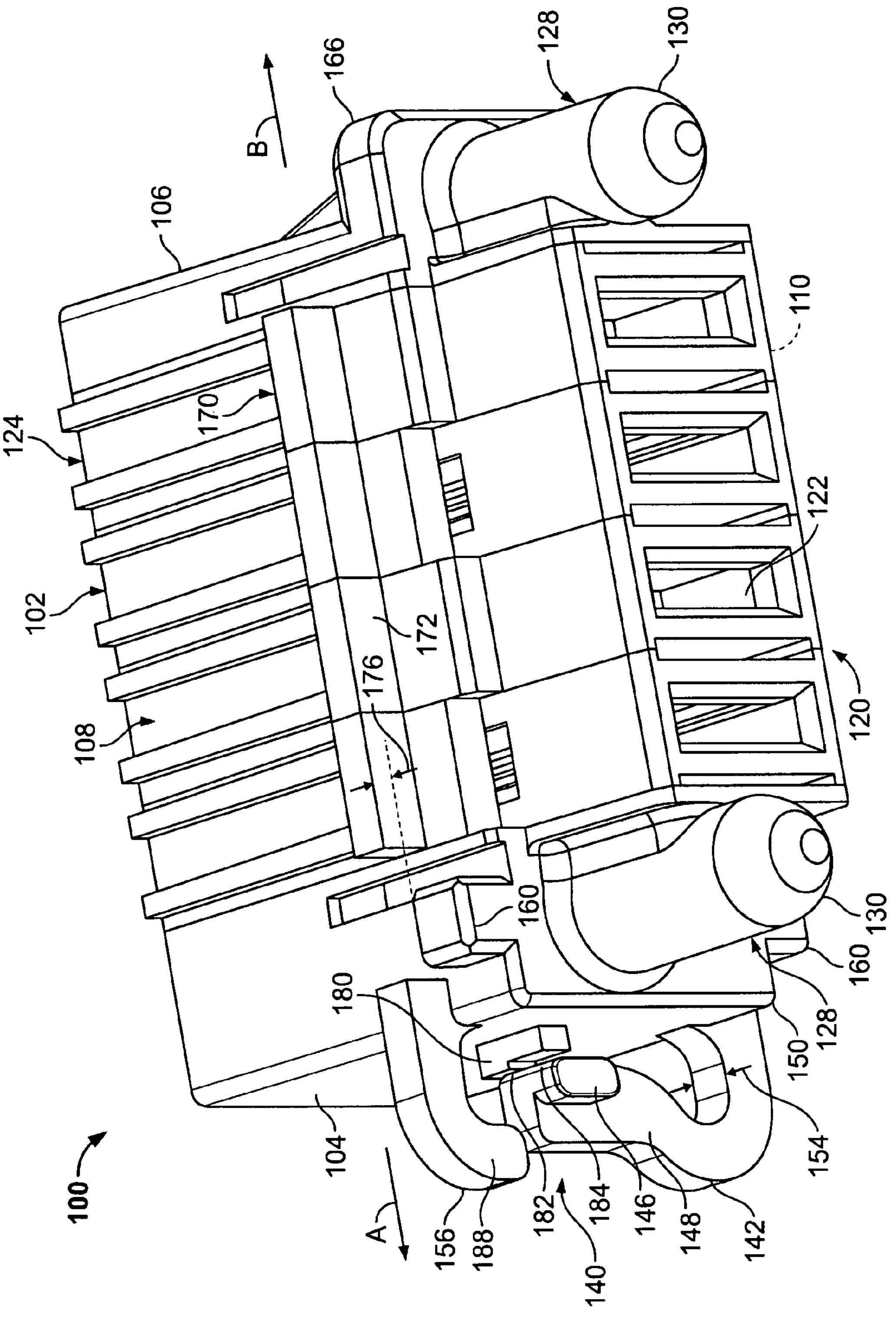
FIG. 1 is a perspective view of a connector formed in accordance with an exemplary embodiment of the present invention.

FIG. 1 is a perspective view of an electrical connector 100 formed in accordance with an exemplary embodiment of the present invention. As illustrated in FIG. 1, connector 100 is a receptacle connector 100. In alternative embodiments, the connector may be a header or plug connector as will be described. The connector 100 includes a housing 102 formed from a dielectric material. Housing 102 has a first side 104, a second side 106 opposite the first side 104, a third side 108 and a fourth side 110 opposite the third side 108. Housing 102 has a forward mating end 120 that includes a plurality of contact openings 122 holding a plurality of contacts (not shown). Contact openings 122 receive contacts from a mating header or plug connector (not shown). In one embodiment, the contacts (not shown) are joined to a plurality of cables (not shown) that extend from a rearward end 124 of housing 102 that is opposite mating end 120. Guideposts 128 extend forwardly from forward mating end 120 of housing 102. Guideposts 128 are configured to be received in guidepost channels in a mating connector (not shown). Guideposts 128 position and align connector 100 with the mating connector. Guideposts 128 may include tapered ends 130 that allow connector 100 to be used in blind mate applications.

A latch member 140 is formed on first side 104 of housing 102. Latch member 140 includes a latch beam 142 that extends from first side 104 of housing 102 in the direction of the arrow A. A latch element 146 is positioned on a forward facing surface 148 of latch beam 142. In an exemplary embodiment, latch beam 142 extends from an end 150 of first side 104 and is formed with an arcuate shape. The arcuate shape of latch beam 142 provides a latch beam 142 that has an increased length that imparts sufficient flexibility to latch beam 142 to allow for an increased thickness 154 of latch beam 142 to provide robustness for the latch member 140. A latch guard 156 is provided for added protection of latch beam 142 during shipment or from unusually rough handling. Latch guard 156 has a forward facing surface 158.

Receptacle housing 102 also includes locating lugs 160 that extend from third and fourth sides 108 and 110, respectively, of housing 102. In one embodiment, locating lugs 160 are substantially opposite each other. In other embodiments, the locating lugs 160 may not be opposite each other. Rather, they may be located in any position that does not allow connector 100 to be mounted on a connector panel, such as the panel 200 (FIG. 2) with inverted polarity. That is, the locating lugs 160 may be located in any position that provides for only one orientation of connector 100 within the connector panel 200. A retention tab 166 is formed on the second side 106 of housing 102. Retention tab 166 extends from second side 106 in the direction of the arrow B which is substantially opposite in direction from the arrow A. In one embodiment, retention tab 166 has a length (not shown) that is substantially equal to a length (not shown) of the second side 106. Thus, the retention tab 166 may traverse the full length of second side 106.

Figure 2:
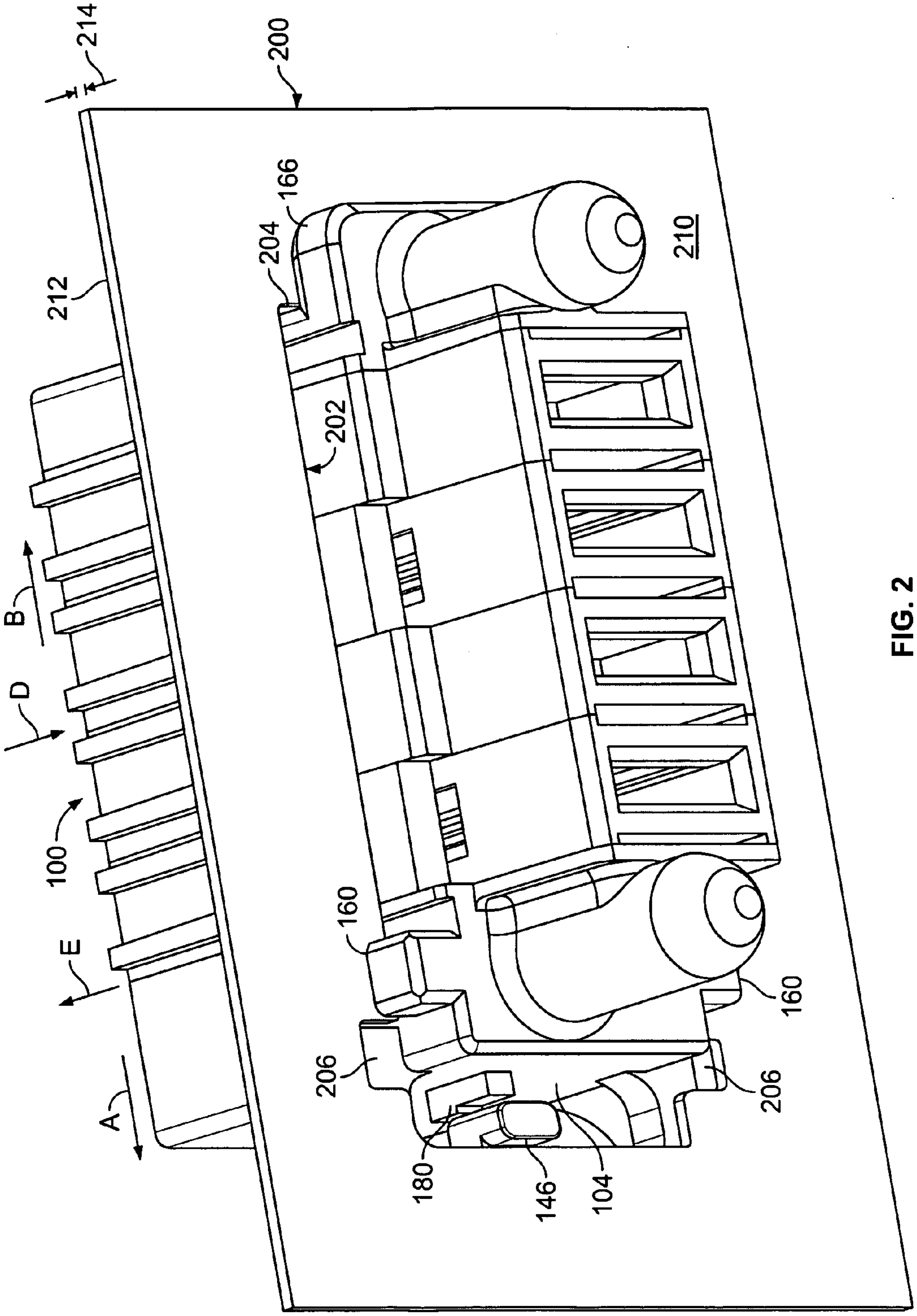
FIG. 2 is a perspective view of the connector shown in FIG. 1 mounted in a connector panel.

The housing 102 includes flanges 170 formed on third and fourth sides 108 and 110, respectively. Each flange 170 has a front face 172 that is substantially coplanar with the forward facing surfaces 148, 158 of the latch beam 142 and latch guard 158, respectively. The locating lugs 160 are disposed forwardly from flanges 170 and the latch beam 142 forming a gap 176 that is sized to receive a thickness 214 (FIG. 2) of the connector panel 200 (FIG. 2). A stop member 180 is formed on first side 104 of housing 102. Stop member 180 includes a first stop surface 182 and a second stop surface 184.

Figure 3:
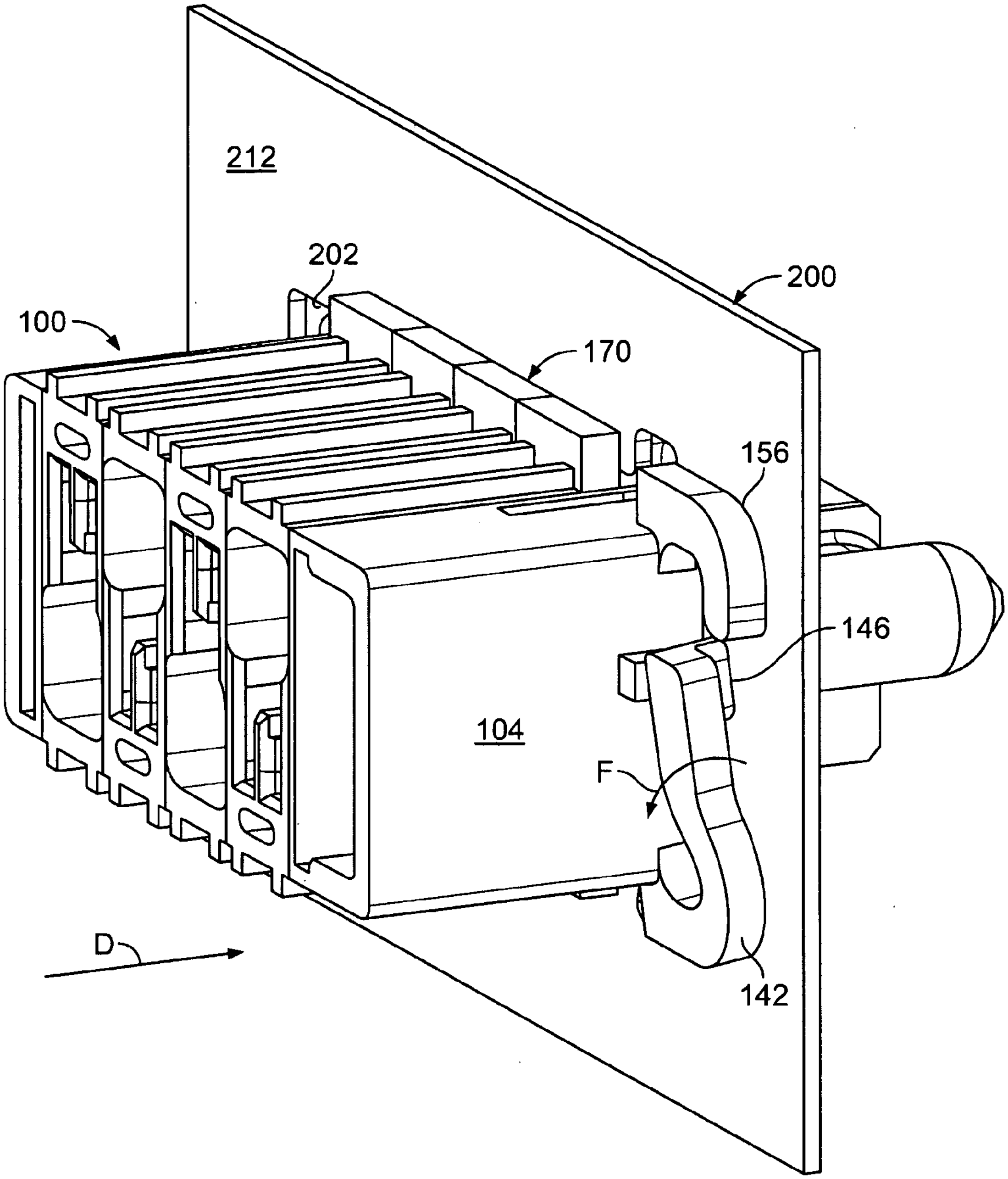
FIG. 3 is a rear perspective view of the connector shown in FIG. 1 mounted in a connector panel.

FIG. 2 is a perspective view of connector 100 mounted in a connector panel 200. In FIG. 2, connector 100 is in a latched position. FIG. 3 is a rear perspective view of connector 100 in an insertion position in connector panel 200. The connector panel 200 includes a panel opening 202 that has an inner edge 204 that extends about a perimeter of the panel opening 202. The panel opening 202 is configured to receive connector 100. The panel opening 202 is sized such that, rather than an interference fit, clearance is provided between connector 100 and connector panel 200 to provide connector 100 with some degree of float within the panel opening 202 to allow connector 100 to center itself with a mating connector (not shown) in blind mating situations. Connector panel 200 includes a pair of slots 206 that extend from edge 204 of panel opening 202. Connector panel 200 has a first or front side 210, an opposite second or rearward side 212, and a thickness 214 between the first and second sides 210 and 212, respectively.

In mounting connector 100, the connector housing 102 is inserted through the connector panel opening 202 from the second side 212 in the direction of the arrow D. Insertion is accomplished by aligning the locating lugs 160 with the slots 206. The locating lugs 160 and slots 206 are offset from a center position toward one of the first and second sides 104 and 106 (FIG. 1). In the arrangement shown, slots 206 and locating lugs 160 are offset toward first side 104. The connector 100 is advanced in a loading direction, in the direction of the arrow D, until the front faces 172 (FIG. 1) of flanges 170 and forward facing surface 158 of latch guard 156 engage second side 212 of connector panel 200 which represents an insertion position wherein retention tab 166 and locating lugs 160 are positioned adjacent first side 210 of connector panel 200. In the insertion position, latch element 146 also engages second side 212 of connector panel 200 and latch beam 142 is deflected rearwardly, pivoting in the direction of the arrow F (FIG. 3). In the insertion position, latch beam 142 also clears stop member 180.

Connector 100 is then slid in a latching direction substantially perpendicular to the loading direction, that being in the direction of the arrow B, while pressure is applied against the second side 212. When connector 100 has moved sufficiently in the direction of the arrow B, latch element 146 snaps through connector panel opening 202 and engages the inner edge 204 of the panel opening which corresponds to the latched position shown in FIG. 2. In the latched position, latch element 146 engages inner edge 204 of panel opening 202 to inhibit movement of connector 100 away from the latched position in the direction of the arrow A. In addition, the retention tab 166 and the locating lugs 160 engage the first side 210 of connector panel 200 to inhibit extraction of connector 100.

Removal of connector 100 is accomplished by pushing inward on the latch element 146 in the direction of the arrow E until latch element 146 clears or passes the inner edge 204 of panel opening 202 and sliding connector 100 in the direction of the arrow A until the insertion position is reached wherein locating lugs 160 are aligned with slots 206. Connector 100 can then be withdrawn from connector panel 200 in the direction of the arrow E.

Figure 4:
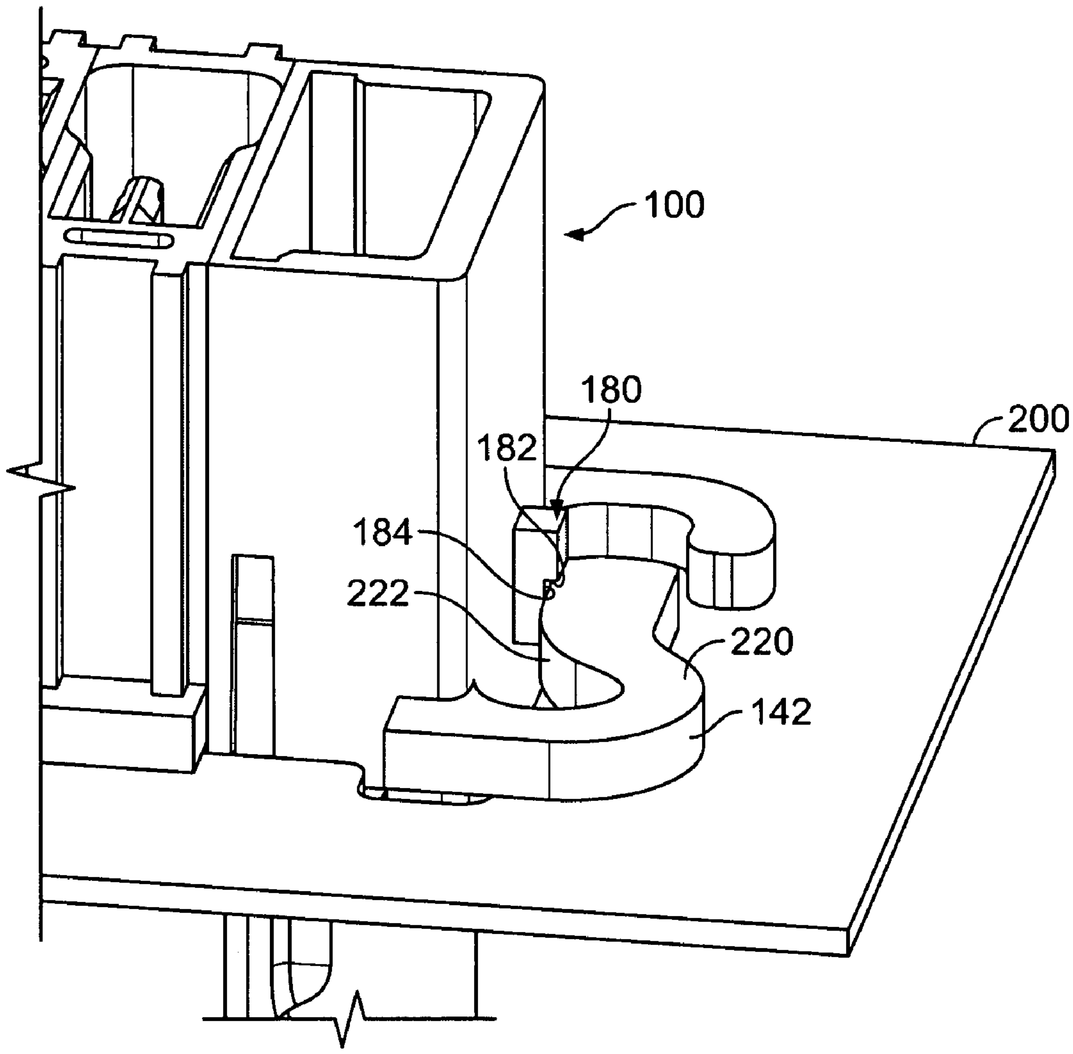
FIG. 4 is a partial rear perspective view of the connector shown in FIG. 1 mounted in a connector panel.

FIG. 4 illustrates the operation of stop member 180. Stop member 180 is provided to inhibit inadvertent removal of connector 100 from connector panel 200 when latch element 146 has not been depressed past inner edge 204 of panel opening 202. When it is attempted to move connector 100 in the direction of arrow A without first depressing latch element 146, stop member 180 is moved into engagement with latch beam 142. First stop surface 182 engages a rearward facing surface 220 of latch beam 142 so that latch element 146 cannot be depressed and connector 100 cannot be extracted from connector panel 200. Further, second stop surface 184 engages an inner surface 222 of latch beam 142 to resist further movement of connector 100 in the direction of arrow A.

Figure 5:
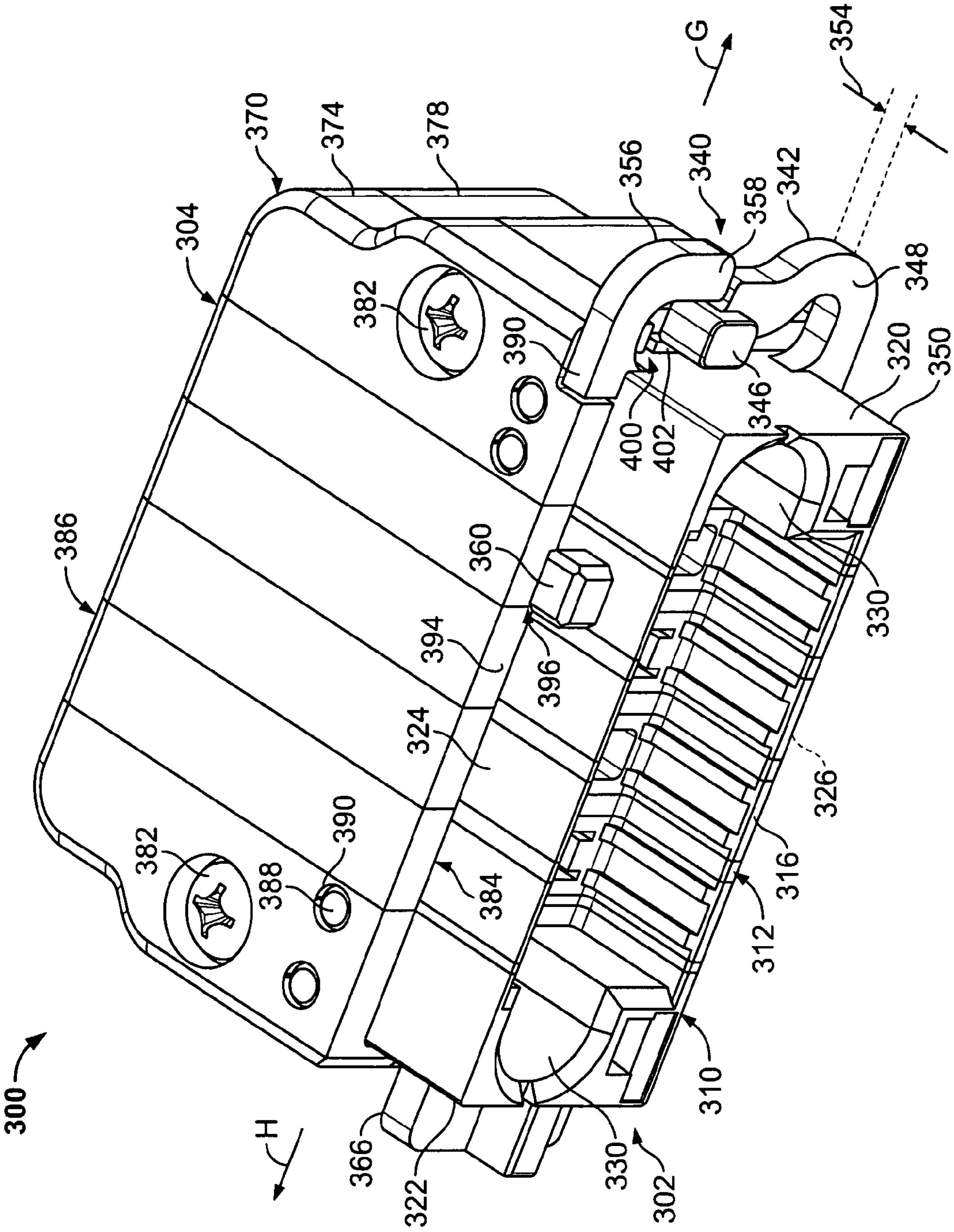
FIG. 5 is a perspective view of a connector assembly formed in accordance with an alternative embodiment of the present invention.

FIG. 5 is perspective view of a header connector assembly 300 formed in accordance with an exemplary embodiment of the present invention. The assembly 300 includes a header connector 302 and a backshell 304. Header connector 302 includes a connector housing 310 formed from a dielectric material. Housing 310 includes a forward mating end 312. A plurality of contacts (not shown) are held proximate forward mating end 312 and are surrounded by a shroud 316. Connector housing 310 includes a first side 320, a second side 322 opposite first side 320, a third side 324 and a fourth side 326 opposite third side 324. Guidepost channels 330 extend from forward mating end 312 rearwardly into connector housing 310. Guidepost channels 330 are sized and configured to receive guideposts (not shown) from a mating connector (not shown) to position and align connector 302 with the mating connector.

A latch member 340 is formed on first side 320 of connector housing 310. Latch member 340 includes a latch beam 342 that extends from first side 320 of connector housing 302 in the direction of the arrow G. A latch element 346 extends from a forward facing surface 348 of latch beam 342. In an exemplary embodiment, latch beam 342 extends from an end 350 of first side 320 and is formed with an arcuate shape. The arcuate shape of latch beam 342 provides a latch beam 342 that has an increased length that imparts sufficient flexibility to latch beam 342 to allow for an increased thickness 354 of latch beam 342 to provide robustness for the latch member 340. In an exemplary embodiment, latch guard 356 extends outward and downward sufficiently to overlap latch beam 342, thus limiting outward deflection of latch beam 342 to provide additional protection for latch beam 342 during shipment or from unusually rough handling. Latch guard 356 has a forward facing surface 358.

Connector housing 302 also includes locating lugs 360 that extend from third and fourth sides 324 and 326 of housing 302. In one embodiment, locating lugs 360 are substantially opposite one another. A retention tab 366 is formed on second side 322 of connector housing 302. Retention tab 366 extends from the second side 322 in the direction of the arrow H which is substantially opposite in direction of the arrow G. In one embodiment, retention tab 366 has a length (not shown) that is substantially equal to a length (not shown) of the second side 322. Thus, the retention tab 166 may traverse the full length of second side 322.

Backshell 304 includes a backshell housing 370 that includes an upper portion 374 and a lower portion 378. Backshell upper and lower housing portions, 374 and 378 respectively, are held together by fasteners 382. In one embodiment, the fasteners 382 are self tapping screws, although other fasteners may be utilized in other embodiments. Backshell 304 has a forward facing connector receiving end 384 that receives connector housing 302 and an opposite cable exit end 386. Complementary keying and retention features 388 and 390 on housing 302 and backshell 304, respectively, cooperate to locate and retain connector housing 310 in backshell housing 370. Backshell housing 370 includes a cutout portion 390 that receives latch member 340 and latch guard 356 such that forward facing surfaces 348 and 358 of latch beam 342 and latch guard 356 are substantially co-planar with an edge 394 of backshell housing 370 at connector receiving end 384. In alternative embodiments, latch member 340 may be located on backshell 304. Header connector 302 and backshell 304 are configured for mounting to a connector panel 200 (see FIG. 2). Locating lugs 360 are positioned sufficiently forward of edge 394 to create a gap 396 between locating lugs 360 and edge 394 that is sized to receive a thickness 214 (FIG. 2) of connector panel 200. A stop member 400 is formed on first side 320 of connector housing 310. Stop member 400 includes a stop surface 402 that is configured to engage a rearward surface of latch beam 342 if connector assembly 300 is attempted to be removed from connector panel 200 (FIG. 2) without first depressing latch element 346. Latch element 346 is sized to engage first side 320 to limit movement of connector 300 in the direction of arrow G when latch element 346 is not first depressed. Mounting and removal of connector assembly 300 into and from panel 200 is as previously described with respect to receptacle connector 100.

The embodiments thus described provide a receptacle connector 100 and a header connector assembly 300 that save space on a connector panel 200 and are mountable without tools. The receptacle connector and header connector assembly include latch members 140, 340 that latch the receptacle connector and header connector assembly in a latched position on the connector panel. The latch members include arcuate latch beams 142, 342 that are sufficiently flexible due to their overall lengths that they can be fabricated with an increased thickness to add robustness to the latch members. Stop members 180, 400 are provided that prevent inadvertent removal of the receptacle connector and header assemblies from the panel.

While the invention has been described in terms of various specific embodiments, those skilled in the art will recognize that the invention can be practiced with modification within the spirit and scope of the claims.

What is claimed is:

1. An electrical connector for mounting to a panel, the connector comprising:

a connector housing having a forward mating end and a first side, said housing being configured to be inserted into a panel opening in the panel, the panel opening having an inner edge, and wherein said housing is inserted into the panel opening in a loading direction and is movable laterally relative to the panel opening in a latching direction to a latched position, the latching direction differing from the loading direction;

a latch member including a latch beam extending from said first side of said housing and a latch element positioned on a forward facing surface of said latch beam, wherein said latch element engages the inner edge of the panel opening when said housing is in said latched position to hold said housing in said latched position; and a stop member formed on said first side of said housing, said stop member positioned to engage a rearward facing surface of said latch beam to inhibit removal of said housing from the panel opening when said housing is in said latched position.

2. The connector of claim 1, further comprising a backshell including a connector receiving end and a cable exit end, said connector housing coupled to said connector receiving end of said backshell, said backshell having an edge at said connector receiving end that engages the panel to limit movement of said housing in said loading direction, and wherein said latch member is located on one of said housing and said backshell.

3. The connector of claim 1, wherein said stop member is configured to engage said latch beam to limit movement of said housing in a direction opposite said latching direction while said latch element is engaged with the inner edge of the panel opening.

4. The connector of claim 1, wherein a portion of said forward facing surface of said latch beam engages the panel to limit movement of said connector in said loading direction.

5. The connector of claim 1, wherein said housing includes a locating lug formed on a third side of said housing, said locating lug configured to be received in a locating slot in the panel when said housing is in an insertion position, said locating lug engaging the forward side of the panel to inhibit extraction of said housing from the panel when the housing is in said latched position.

6. The connector of claim 1, wherein said housing includes a locating lug formed on a third side of said housing, said locating lug configured to be received in a locating slot in the panel, and wherein said locating lug is placed in an offset position toward one of said first and second sides to orient the connector within the panel.

7. The connector of claim 1, wherein said latching direction is substantially perpendicular to said loading direction.

8. The connector of claim 1, wherein said housing includes a flange formed on a third side of said housing, wherein said flange engages the panel to limit movement of said housing in said loading direction.

9. The connector of claim 1, wherein said housing includes a flange and a locating lug, both formed on a third side of said housing, wherein said locating lug is disposed forwardly from said flange to define a gap sized to receive a thickness of the panel.

10. The connector of claim 1, further comprising a backshell including a connector receiving end and a cable exit end, said connector housing coupled to said connector receiving end of said backshell, said backshell having an edge at said connector receiving end, said housing including a locating lug formed on a third side of said housing, and wherein said locating lug is disposed forwardly from said edge of said backshell to define a gap sized to receive a thickness of the panel.

11. An electrical connector for mounting to a panel, the connector comprising:

- a connector housing having a forward mating end and a first side, said housing being configured to be inserted into a panel opening in the panel, the panel opening having an inner edge, and wherein said housing is inserted into the panel opening in a loading direction and is movable laterally relative to the panel opening in a latching direction to a latched position, the latching direction differing from the loading direction;
- a latch member including a latch beam extending from said first side of said housing and a latch element positioned on a forward facing surface of said latch beam, wherein said latch element engages the inner edge of the panel opening when said housing is in said latched position to hold said housing in said latched position;
- a stop member formed on said first side of said housing, said stop member positioned to engage a rearward facing surface of said latch beam to inhibit removal of said housing from the panel opening when said housing is in said latched position; and
- a retention tab formed on a second side of said housing opposite said first side, said retention tab having a length substantially equal to a length of said second side, and wherein said retention tab extends from said housing in said latching direction, said retention tab engaging a forward side of the panel to inhibit extraction of said housing from the panel opening when said housing is in said latched position.

12. The connector of claim 11, further comprising a backshell including a connector receiving end and a cable exit end, said connector housing coupled to said connector receiving end of said backshell, said backshell having an edge at said connector receiving end that engages the panel to limit movement of said housing in said loading direction, and wherein said latch member is located on one of said housing and said backshell.

13. The connector of claim 11, wherein said stop member is configured to engage said latch beam to limit movement of said housing in a direction opposite said latching direction while said latch element is engaged with the inner edge of the panel opening.

14. The connector of claim 11, wherein a portion of said forward facing surface engages the panel to limit movement of said connector in said loading direction.

15. The connector of claim 11, wherein said housing includes a locating lug formed on a third side of said housing, said locating lug configured to be received in a locating slot in the panel when said housing is in an insertion position, said locating lug engaging the forward side of the panel to inhibit extraction of said housing from the panel when the housing is in said latched position.

16. The connector of claim 11, wherein said housing includes a locating lug formed on a third side of said housing, said locating lug configured to be received in a locating slot in the panel, and wherein said locating lug is placed in an offset position toward one of said first and second sides to orient the connector within the panel.

17. The connector of claim 11, wherein said latching direction is substantially perpendicular to said loading direction.

18. The connector of claim 11, wherein said housing includes a flange formed on a third side of said housing, wherein said flange engages the panel to limit movement of said housing in said loading direction.

19. The connector of claim 11, wherein said housing includes a flange and a locating lug, both formed on a third side of said housing, wherein said locating lug is disposed forwardly from said flange to define a gap sized to receive a thickness of the panel.

20. The connector of claim 11, further comprising a backshell including a connector receiving end and a cable exit end, said connector housing coupled to said connector receiving end of said backshell, said backshell having an edge at said connector receiving end, said housing including a locating lug formed on a third side of said housing, and wherein said locating lug is disposed forwardly from said edge of said backshell to define a gap sized to receive a thickness of the panel.

* * * * *